United States Patent
Chilukoor et al.

(10) Patent No.: US 7,573,821 B2
(45) Date of Patent: Aug. 11, 2009

(54) DATA PACKET RATE CONTROL

(75) Inventors: Murali Chilukoor, Bangalore Pin (IN); Quang Le, Austin, TX (US); Jain Philip, Bangalore (IN); Sunil Kumar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 556 days.

(21) Appl. No.: 11/206,576

(22) Filed: Aug. 17, 2005

(65) Prior Publication Data

US 2007/0041319 A1 Feb. 22, 2007

(51) Int. Cl.
    *G01R 31/08* (2006.01)
(52) U.S. Cl. .................................... 370/235
(58) Field of Classification Search .......... 370/229–240
    See application file for complete search history.

(56) References Cited

U.S. PATENT DOCUMENTS

| | | | |
|---|---|---|---|
| 6,408,005 B1 * | 6/2002 | Fan et al. | 370/412 |
| 2005/0147033 A1 * | 7/2005 | Chin et al. | 370/229 |
| 2006/0072451 A1 * | 4/2006 | Ross | 370/229 |

* cited by examiner

*Primary Examiner*—Kwang B Yao
*Assistant Examiner*—Tung Q Tran
(74) *Attorney, Agent, or Firm*—Blakely, Sokoloff, Taylor & Zafman LLP

(57) ABSTRACT

A method that includes determining a pending data packet count for one or more data packets associated with data to be forwarded from a node to another node on a communication link and then comparing the pending data packet count to a threshold data packet count value. The method further includes forwarding the one or more data packets to the other node at a rate based on the comparison.

23 Claims, 6 Drawing Sheets

DATA PACKET RATE CONTROL

BACKGROUND

In a networking environment where a node communicates with another node via a communication medium, data transfer can occur between nodes having varying data packet throughput/processing capabilities. Typically, when data (e.g., associated with data frames and/or data packets) is forwarded from a node having an equal or slower throughput capability as compared to the receiving node, congestion at the receiving end of the communication medium does not exist. However, when data is forwarded from a node having a faster throughput capability as compared to a slower receiving node, congestion at the receiving end of the communication medium is common.

Flow control is an example way of addressing congestion at the receiving end of a communication medium. One typical way to implement flow control is to send a message, for example, a pause frame. The message instructs one or more other nodes to stop forwarding data to a congested node until another message is sent from the congested node that instructs the transmitting node(s) to remove the pause and begin/continue to forward the data. This type of flow control is used, for example, between nodes communicating in an Ethernet Local Area Network (LAN) operating in compliance with the Institute for Electrical and Electronic Engineers (IEEE) 802.3 standard for the CSMA/CD (Carrier Sense Multiple Access with Collision Detection) protocol. See IEEE 802.3-2002: IEEE Standard for Information technology—Telecommunications and information exchange between systems—Local and metropolitan area networks—Specific requirements Part 3: CSMA/CD Access Method and Physical Layer Specifications, published August 2002, and/or later versions of the standard (the "Ethernet standard").

Two potential problems may exist with pause frames. First, the congested node in some instances may have to wait for a period of time to send a message to remove a pause to the other node. Second, there is a delay in the time it takes for the other node to decode and respond to the message to remove a pause. For example, if a large data packet is to be forwarded, the congested node typically waits until this large data packet is forwarded before sending a message to remove a pause. Thus, a latency may result. This latency, for example, may delay the forwarding of a short burst of smaller packets.

In one example, a data packet of size 1518 bytes has started to be forwarded from a congested node just before the node decided to send a message to remove a pause. In this example, while the congested node waits to forward this data packet, nineteen data packets each including 64 bytes of data could have been forwarded from the other node. Since the transmission of the nineteen data packets was delayed, communication medium bandwidth may have been wasted.

Another way to implement flow control is using a given constant Packet to Packet Gap (PPG) at the transmitting node. In one example, PPG is a sum of an Inter Packet Gap (IPG) and a packet length or size. Stated differently, PPG may be the gap between the start times of two consecutive packets. The constant PPG is typically determined based on the disparity in the throughput capability (e.g., packets/unit of time) of the transmitting node as compared to the receiving node over a communication medium. For example, a 10% disparity exists if the receiving node has a throughput capability of 100 packets/unit of time and the transmitting node can forward data packets at a rate of 110 packets/unit of time. As a result, a given constant PPG gap is needed at the transmitting node to delay the forwarding of packets to accommodate for this 10% disparity in throughput capability and avoid congestion at the receiving node.

In one example, with the 10% disparity between the nodes stated above, the average size of data packets forwarded from the transmitting node is 200 bytes. As a result, the transmitting node may insert an extra delay. When inserted, the extra delay results a time delay that would equate to forwarding 200 bytes×10%=20 bytes of additional data. The communication medium may also have a minimum IPG to facilitate a delineation of data packets, for example, a 20 byte minimum IPG. The transmitting node may maintain a given constant PPG gap between the start times of data packets transmitted to the receiving node based on the average size of data packets (200 bytes), the additional delay due to the throughput disparity (20 bytes) and the minimum IPG (20 bytes). As a result, the given constant PPG gap maintained by the transmitting node is 240 bytes.

Since PPG is the gap between the start times of two consecutive data packets, data packets of sizes greater than 220 bytes plus the minimum IPG of 20 bytes will meet or exceed the constant PPG of 240 bytes. Since congestion is unlikely to occur for data packets of these sizes, these data packets are forwarded without any additional delay. Data packets of sizes smaller than 220 bytes are forwarded only after a delay to avoid congestion. However, the delaying of data packets smaller than a size of 220 bytes will not allow the bursting of these smaller data packets, even if the receiving node has enough buffer capacity to absorb some or the entire burst. Thus, communication medium's bandwidth may be under-utilized with a constant PPG that does not account for the buffer capacity of the receiving node.

DETAILED DESCRIPTION

As mentioned in the background, implementing flow control using pause frames can be problematic when a congested node is transmitting a large sized data packet prior to sending a message to remove a pause. A typical solution is to use a constant PPG. A constant PPG reduces burstiness but may result in under-utilized bandwidth on a communication medium between nodes that forward both large and small sized data packets.

In one example, as described in more detail below, a pending data packet count for one or more data packets associated with data to be forwarded on the communication medium is determined. The pending data packet count is then compared to a threshold data packet value. Based on this comparison, a node may delay or reduce the rate at which the data packets are forwarded or transmitted to another node. This process of counting, comparing and delaying based on the comparison may minimize and/or reduce burstiness and may also enable a greater utilization of bandwidth on the communication medium between a node forwarding data packets to a potentially congested node.

Figure 1A:
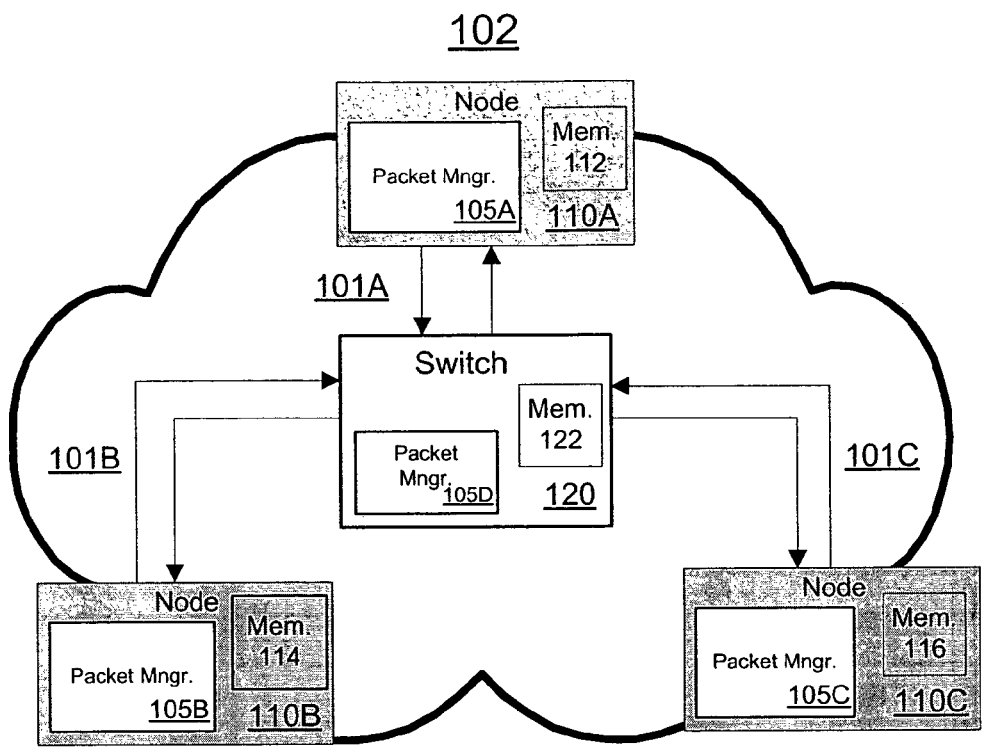
FIG. 1A is an illustration of elements of an example network.

FIG. 1A is an illustration of elements of an example network 102. Network 102 may operate in compliance with one or more industry standards such Ethernet, Advanced Switching Interconnect (ASI), Synchronous Optical NETwork (SONET), Asynchronous Transfer Mode (ATM), IEEE 802.11 and/or IEEE 802.16.

In one example, Network 102 is a Local Area Network (LAN) operating in compliance with the Ethernet standard. Additionally, elements coupled in network 102 (e.g., switch 120, nodes 110A-C) may forward data on network 102. These elements may also operate in compliance with the Ethernet standard and may route/forward the data via point-to-point communication links 101A-C. The data to be forwarded may be in the form of one or more data frames or data packets. These data packets may include an Ethernet header. In one example, the rate at which each receiving node/switch on network 102 processes the one or more data packets and/or forwards the data packets to another element is referred to as a throughput capability. The throughput capabilities may be based, at least in part, on the resources available to the receiving node/switch. Resources available to the receiving node/switch may include, but are limited to, the capacity and/or number of buffers, processing elements, the number of input (ingress) and output (egress) ports.

Figure 1B:
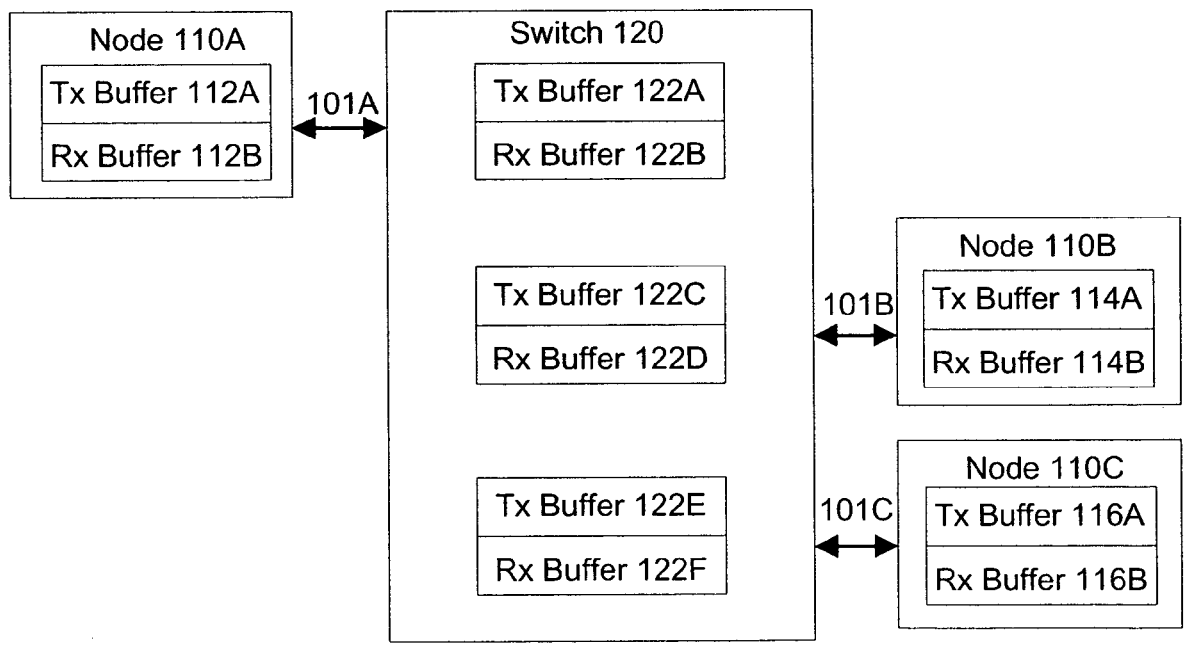
FIG. 1B is an illustration of transmit and receive buffers associated with point-to-point communication links in the network.

As depicted in FIG. 1A, switch 120 and nodes 110A-C are coupled to network 102. Additionally, switch 120 is coupled to nodes 110A-C through point-to-point communication links 101A-C. Switch 120 and nodes 110A-C each include a memory. For example, switch 120 includes memory 122 and nodes 11A-C include memory 112, 114 and 116, respectively. In one implementation, this memory may include, but is not limited to transmit (Tx) and receive (Rx) buffers as depicted in FIG. 1B. In one example, these Tx and Rx buffers may be associated with and facilitate the forwarding of data over one or more point-to-point communication links between switches and/or nodes within and/or remote to network 102.

In one example, switch 120 has Tx and Rx buffers 122A-B and node 110A has Tx and Rx buffers 112A-B. These Tx and Rx buffers may be associated with point-to-point communication links 101A. In one implementation, data is to be forwarded or transmitted from node 110A to switch 120 over point-to-point communication link 101A. This data may be associated with one or more data packets. In one example, node 110A may be able to forward data packets at a rate that is faster than switch 120's throughput capabilities. Additionally, Rx buffer 122B may not have enough capacity to compensate for the disparity. Thus, node 110A may have to delay or throttle/reduce the rate at which data packets are forwarded to switch 120. This may avoid the dropping of data packets should Rx x buffer 122B over fill. However, as a result of the delay, congestion in the flow of data packets between node 110A and switch 120 may occur on point-to-point communication link 101A while node 110A waits for switch 120 to process pending data packets before forwarding additional data packets.

In one example, a packet manager 105 responsive to and/or resident within nodes 110A-C and switch 120, may reduce and/or minimize the effects of congestion between elements in network 102 (e.g., under-utilized bandwidth). For example, a packet manager 105A resident within node 110A may determine a pending data packet count for one or more data packets associated with data to be forwarded from node 110A to another node/switch (e.g., switch 120) on a communication link (e.g., point-to-point communication link 101A). The pending data packet count, may be based, at least in part, on the number of data packets that are forwarded to the other node or switch on the communication link and also on the throughput capability of the other node or switch.

In one example, node 110A's packet manager 105A may compare a pending data packet count for data packets associated with data to be forwarded from node 110A to switch 120 to a threshold pending data packet count value. This threshold pending data packet count value, in one example, is based, at least in part, on the Rx buffer capacity of the receiving node/switch. Packet manager 105A may then communicate the results of the comparison to, for example, control logic for node 110A (see FIG. 3). Node 110A then forwards the one or more data packets to switch 120 at a rate based on the comparison made by packet manager 105A. Node 110A may delay or reduce the rate at which data packets are forwarded to switch 120 based on this comparison.

Figure 2:
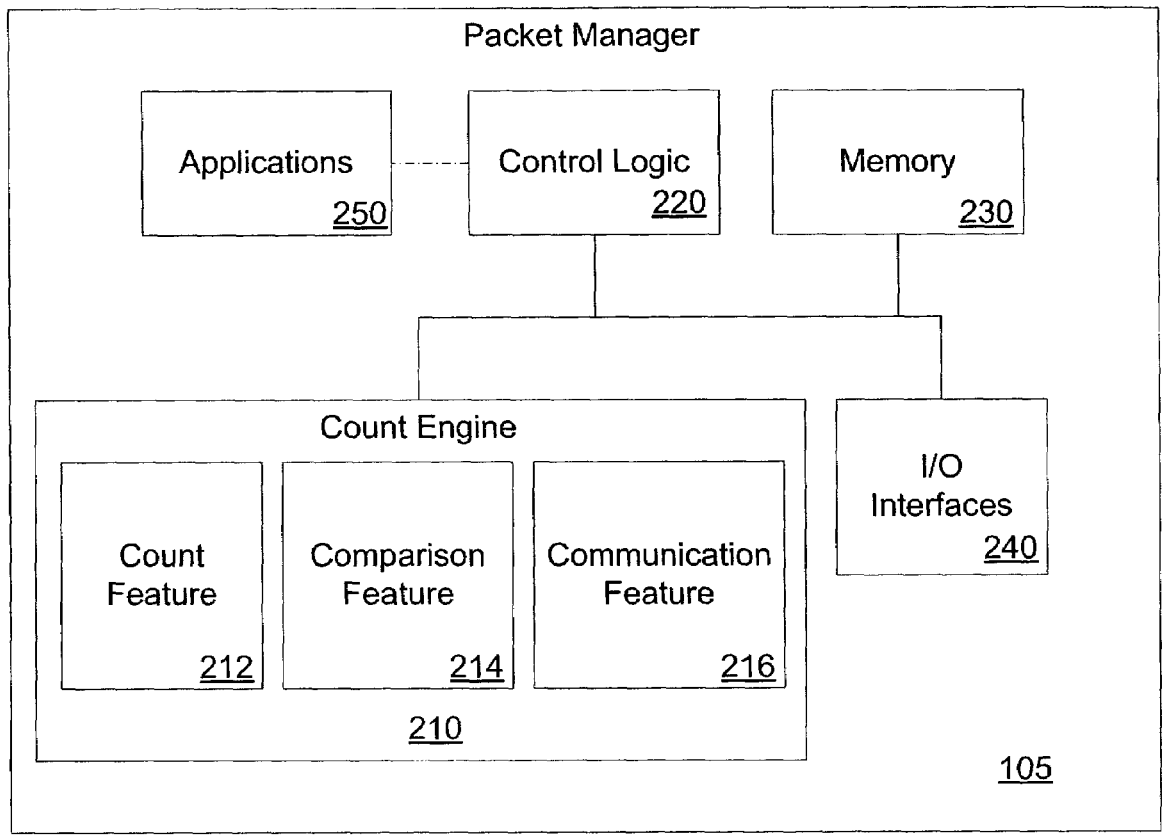
FIG. 2 is a block diagram of an example packet manager architecture.

FIG. 2 is a block diagram of an example packet manager 105 architecture. In FIG. 2, packet manager 105 includes a count engine 210, control logic 220, memory 230, input/output (I/O) interfaces 240, and optionally one or more applications 250, each coupled as depicted.

In FIG. 2, count engine 210 includes a count feature 212, comparison feature 214 and communication feature 216. In one implementation, these features determine a pending data packet count for one or more data packets associated with data to be forwarded from a node to another node on a communication link. The features may then compare the pending data packet count to a threshold data packet count value and then communicate that comparison to the node forwarding the data. The node may then forward one or more data packets to the other node at a rate that is based on the comparison.

Control logic 220 may control the overall operation of packet manager 105 and may represent any of a wide variety of logic device(s) and/or executable content to implement the control of packet manager 105. In this regard, control logic 220 may include a microprocessor, network processor, microcontroller, field programmable gate array (FPGA), application specific integrated chip (ASIC), or executable content to implement such control features, and/or any combination thereof. In alternate examples, the features and functionality of control logic 220 may be implemented within count engine 210.

According to one example, memory 230 is used by count engine 210 to temporarily store information. For example, information related to the counting and the comparison of pending data packets and/or communicating the results of that comparison. Memory 230 may also store executable content. The executable content may be used by control logic 220 to implement count engine 210.

I/O interfaces 240 may provide a communications interface between packet manager 105 and an electronic system. For example, packet manager 105 is implemented as an element of a computer system. I/O interfaces 240 may provide a communications interface between packet manager 105 and the computer system via a communication medium or link. As a result, control logic 220 can receive a series of instructions from application software external to packet manager 105 via I/O interfaces 240. The series of instructions may activate control logic 220 to implement one or more features of count engine 210.

In one example, packet manager 105 includes one or more applications 250 to provide internal instructions to control logic 220. Such applications 250 may be activated to generate a user interface, e.g., a graphical user interface (GUI), to enable administrative features, and the like. In alternate examples, one or more features of count engine 210 may be implemented as an applications 250, selectively activated by control logic 220 to implement such features.

In one implementation, count engine 210 may activate count feature 212 to determine a pending data packet count for data packets associated with data to be forwarded from node 110A on point-to-point communication link 101A to switch 120. In one example, the pending data packet count is based, at least in part, on the data packets selected for forwarding and/or forwarded to switch 120. Count feature 212 may temporarily store the pending data packet count in a memory (e.g., memory 230).

Count engine 210 may also activate comparison feature 214. Comparison feature 214 may obtain the pending data packet count (e.g., from memory 230). Comparison feature 214 may also obtain a threshold pending data packet count value (e.g., from memory 230). In one example, the threshold pending data packet count value may be based, at least in part, on the capacity of Rx buffer 122B within switch 120. Count engine 210 may then activate communication feature 216 to communicate the comparison to, for example, control logic for node 110A. Node 110A, for example, may delay forwarding and/or modify the rate at which it forwards one or more data packets to Switch 120 via point-to-point communication link 101A based, at least in part, on the comparison.

In one implementation, packet manager 105 may be resident within and/or remotely located to a node coupled to a network (e.g., network 102). Packet manager 105 may determine and compare the pending data packet count to a threshold pending data packet count and then communicate any comparisons to the node or to any element that may control or influence the rate at which the node forwards data packets to other nodes and/or switches coupled to the network.

Packet manager 105 may be implemented as one or more of an ASIC, special function controller or processor, FPGA, network processor, other hardware device and firmware or software to perform at least the functions described in this disclosure.

Figure 3:
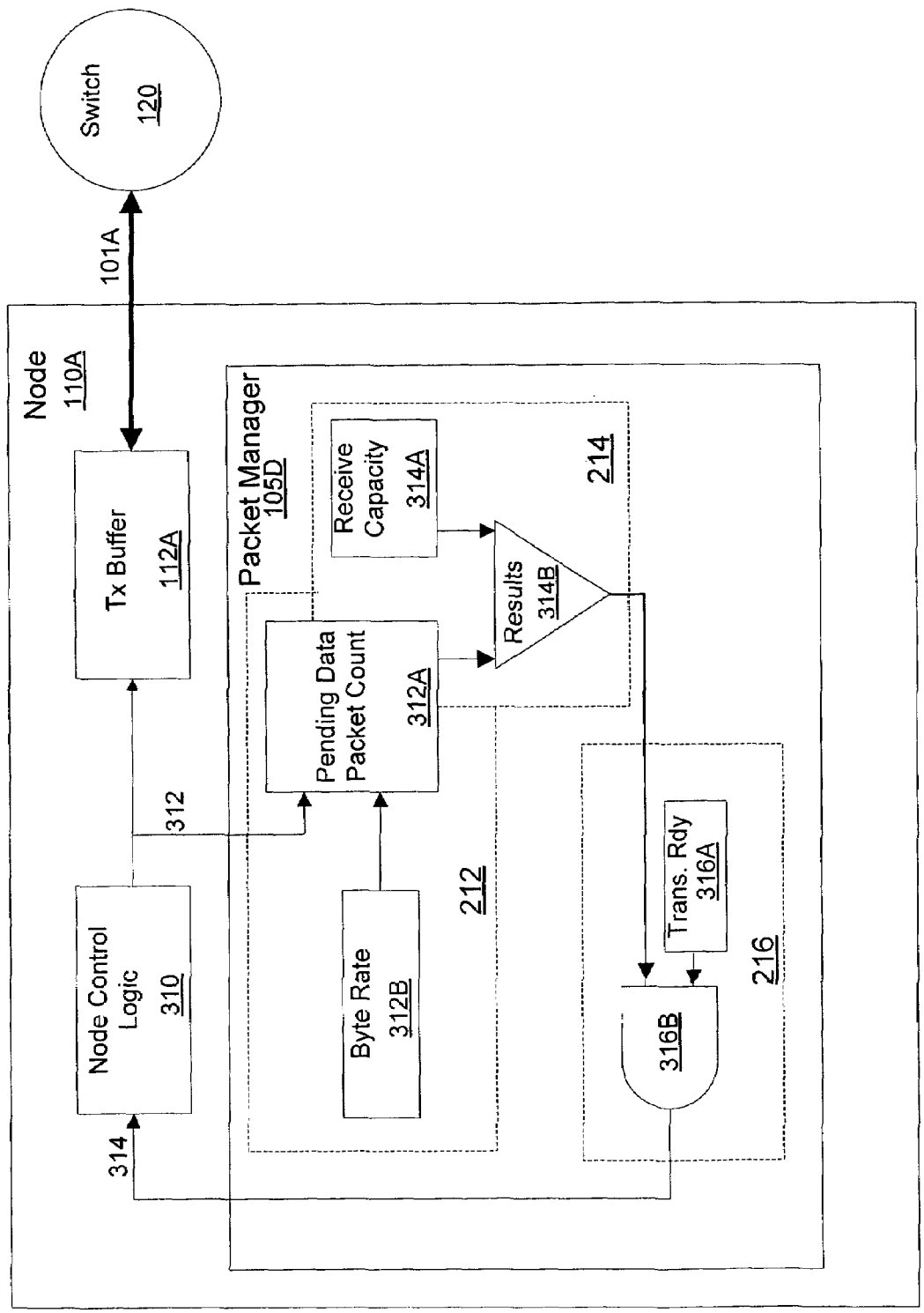
FIG. 3 is an example block diagram of a node on a communication link with a switch, the node including the packet manager.

FIG. 3 is an example block diagram of node 110A on point-to-point communication link 101A with switch 120. As depicted in both FIG. 1A and FIG. 3, node 110A also includes packet manager 105A. In one example, elements of packet manager 105 are coupled to node control logic 310 via communication links 312 and 314.

In one implementation, data packets associated with data are to be forwarded from node 110A to switch 120 on point-to-point communication link 101A. In this implementation, the throughput capability of switch 120 is maintained/stored in byte rate 312B. The throughput capability in byte rate 312B may include a byte rate at which switch 120 can process and/or forward a given amount of received data in bytes per unit of time, although this disclosure is not limited to only bytes/unit of time, as a measure of throughput capability. In on example, the byte rate 312B may be a portion of a memory (e.g., memory 230) such as a memory register.

In one example, the throughput capability associated with switch 120 and stored in byte rate 312B is based on one or more parameters exchanged when point-to-point communication link 101A was established/activated. In another example, the throughput capability is based on information exchanged on a periodic basis between switch 120 and node 110A (e.g., during run-time). In yet another example, a user (e.g., through a user interface, or setting one or more manual switches to a memory register) may modify or enter a fixed byte rate value for switch 120's throughput capability. This fixed byte rate value may be stored in byte rate 312B.

In one example, the throughput capacity associated with a node/switch and stored in byte rate 312B may be based on a guaranteed minimum data packet processing bandwidth or throughput for a communication link between nodes/switches. For example, the guaranteed minimum throughput may be based on the requirements of an industry standard such as the Ethernet standard (e.g., 10 Gigibits/sec) or may be based on a quality of service (QoS) commitment for types of data associated with a given traffic and/or priority class. For example, a QoS commitment for data associated with a high priority or an important traffic class may result in a guaranteed minimum throughput that requires a higher byte rate throughput capability. A lower byte rate throughput capability may be associated with low priority or less important traffic classes.

In one implementation, the capacity (e.g., in bytes) of switch 120's Rx buffer 122A may be maintained in receive capacity 314A. The capacity value may be at least temporarily stored in a portion of a memory (e.g., memory 230) such as a memory register. Similar to throughput capability, the capacity value may be based on parameters exchanged between node 110A and switch 120 and/or a user may modify and/or enter a given capacity value. In one example, the capacity value may be a threshold pending packet count value that is compared to a pending data packet count associated with data forwarded to switch 120 via point-to-point communication link 101A.

In one implementation, node 110A may include a media access controller or MAC (not shown) to facilitate and/or control the forwarding of data from node 110A to destinations and/or intermediate destinations such as switch 120. In one example, the MAC may communicate with packet manager 105A to indicate whether data packets associated with data to be forwarded to switch 120 are ready for transmission. The indication may be maintained in transmit ready 316A. In one example, transmit ready 316A may be a portion of a memory (e.g., memory 230) such as a memory register. In that regard, a bit flag stored in transmit ready 316A may be asserted (e.g., bit flag=1) to indicate the MAC is ready to forward data packets and may be de-asserted (e.g., bit flag=0) to indicate the MAC is not ready to forward data packets.

In one example, one or more data packets are to be forwarded to switch 120 from node 110A. Count engine 210 may activate count feature 212. Count feature 212 may monitor communication link 312 and may increment a pending data packet count as or after the one or more packets are forwarded to switch 120 (e.g., stored within or exiting from Tx buffer 112A). Count feature 212 may increment the pending data packet count by a unit of measure that may be based on either the actual size of the packet or an average size. The average size may be a predetermined fixed average or a running average value for data packets to be forwarded on point-to-point communication link 101A.

In one implementation, count feature 212 may then decrement the pending data packet count based on the throughput capability associated with switch 120 and stored in byte rate 312B. The resulting pending data packet count is temporarily stored in a pending data packet count 312A. In one example, the pending data packet count 312A may be in a portion of a memory (e.g., memory 230) such as a memory register.

Count engine 210 may then activate comparison feature 214. Comparison feature 214, in one example, obtains the pending data packet count from pending data packet count 312A and the threshold pending data packet count value from receive capacity 314A. Comparison feature 214 may compare the count to the threshold and then temporarily store the results of the comparison in results 314B. In one example, results 314B may be a portion of a memory (e.g., memory 230) such as a memory register.

In one implementation, the results of the comparison may be indicated/communicated by a bit flag. The bit flag may be selectively asserted based on whether the pending data packet count is less than the threshold pending data packet count value. For example, count feature 212 may determine that the pending data packet count is at a value of 9 units (e.g., 1 unit=1 packet of some average data packet size or a size determined during run-time). In addition, the threshold pending data packet count value may have a value of 10 units. In this example, comparison feature 214 may assert the bit flag to indicate that the pending data packet count value (9 units) is less than the threshold pending data packet count value (10 units). Comparison feature 214 may de-assert the bit flag once the pending data packet count value reaches 10 units and may again assert the bit flag if the pending data packet count value falls below 10 units. Comparison feature 214 may temporarily store the selectively asserted bit flag in results 314B.

Count engine 210 may activate communicate feature 216. In one example, communicate feature 216 may obtain and/or access the bit flags in results 314B and transmit ready 316A. As depicted in FIG. 3, in one example, a logical AND operation is performed at 316B by communicate feature 216. In one example, if both bit flags are asserted, then communicate feature 216 may indicate to node control logic 310 via communication link 314 that a data packet can be forwarded to switch 120 with no delay. If either bit flag is de-asserted, communicate feature 216 may indicate to node control logic 310 to delay the forwarding of the data packet to switch 120.

In one example, since the pending data packet count value is being decremented at the throughput capability associated with switch 120 and stored in byte rate 312B, the delay results in the pending data packet count value falling below the threshold pending data packet count. Once the pending data packet count falls below the threshold pending data packet count value, the bit flag in results 314B may be asserted by comparison feature 214. Communicate feature 216, provided that the bit flag in transmit ready 316A is also asserted, may then indicate to node control logic 310 that a data packet can be forwarded with no delay.

In one implementation, this delay and no delay indication by communication feature 216 may result in a given variable packet to packet gap (PPG) between each of the one or more data packets forwarded to switch 120. Since each delay lasts as long as it takes to decrement the pending data packet count value below the threshold pending data packet value, the given PPG is substantially equivalent to the throughput capability associated with switch 120 and stored in byte rate 312B. Additionally, since the PPG may only result as the pending data packet count equals or exceeds that threshold pending data packet count value, the PPG in this implementation, is a non-constant or variable PPG.

In one example, if the pending data packet count is less than the threshold pending data packet value, then there may be no delay between the one or more data packets forwarded to switch 120. As a result, a minimal PPG and/or no intentional delay in the forwarding of the one or more data packets to switch 120 may exist while the count is less than the threshold.

As introduced above, a throughput capability may be associated with a guaranteed minimum throughput for a communication link. Thus, in one example, to meet the guaranteed minimum throughput for point-to-point communication link 101A, the throughput capability stored in byte rate 312B may be associated with a given PPG to meet the guaranteed minimum throughput.

Figure 6:
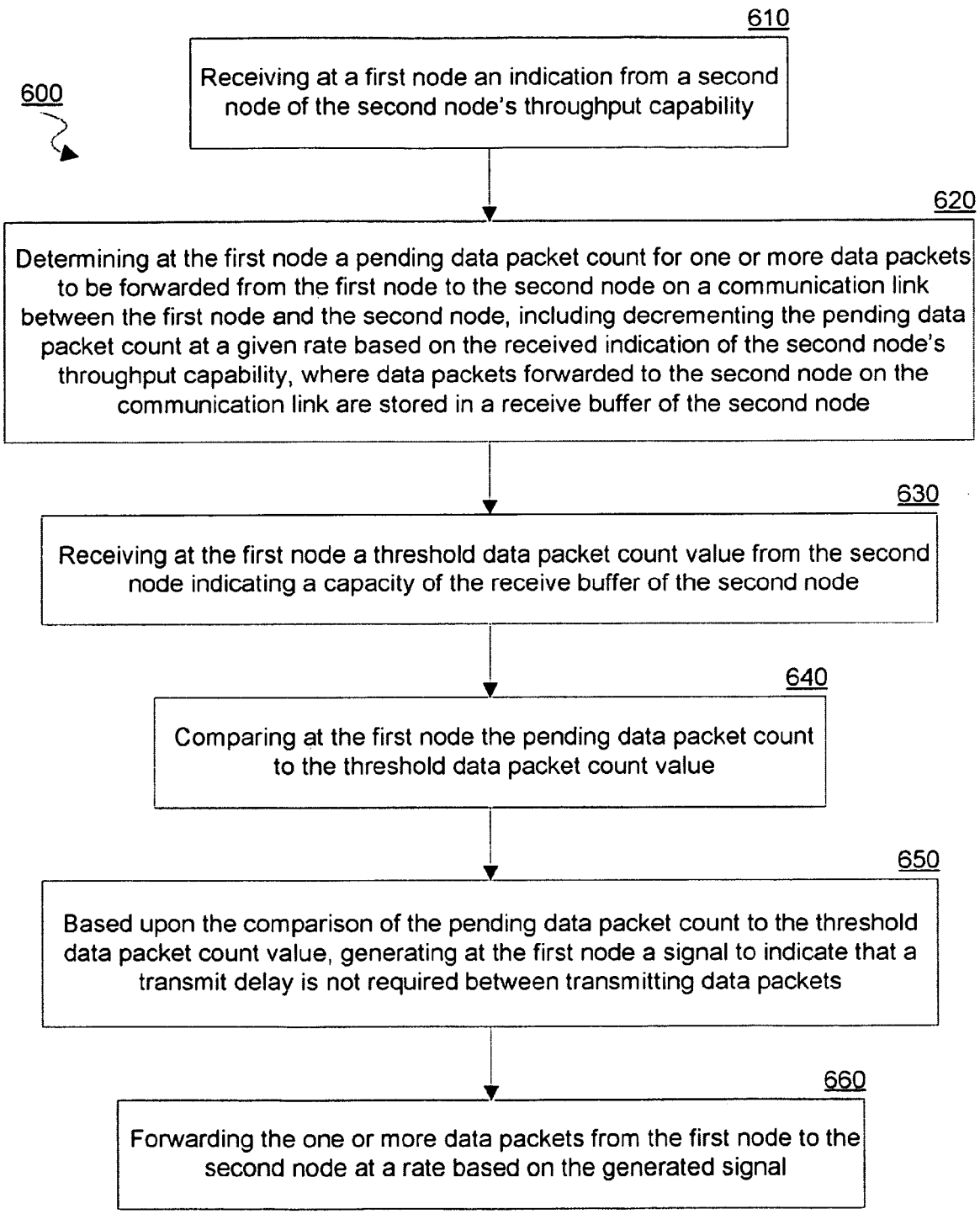
FIG. 6 is a flow diagram illustrating select elements of an algorithm according to an embodiment of the invention.

FIG. 6 illustrates select elements of an algorithm 600 according to an embodiment of the invention. Algorithm 600 may include techniques performed by a first node such as node 110A, for example. In an embodiment, algorithm 600 may include receiving at the first node an indication from a second node—e.g. switch 120—of the second node's throughput capability, at 610. The indication may be stored at the first node—e.g. as byte rate 312B. Algorithm 600 may further include, at 620, determining a pending data packet count for one or more data packets to be forwarded from the first node to the second node on a communication link between the first node and the second node, wherein data packets forwarded to the second node on the communication link are stored in a receive buffer of the second node. In an embodiment, the determining the pending data packet count may include decrementing the pending data packet count at a given rate based on the received indication of the second node's throughput capability.

Algorithm 600 may farther include, at 630, receiving at the first node a threshold data packet count value from the second node indicating a capacity of the receive buffer of the second node. The first node may, at 640, compare the pending data packet count to the threshold data packet count value, and generate, based upon the comparison of the pending data packet count to the threshold data packet count value, a signal to indicate that a transmit delay is not required between transmitting data packets, at 650. Based on the generated signal, the first node may, at 660, forward the one or more data packets from the first node to the second node at a given rate.

Figure 4:
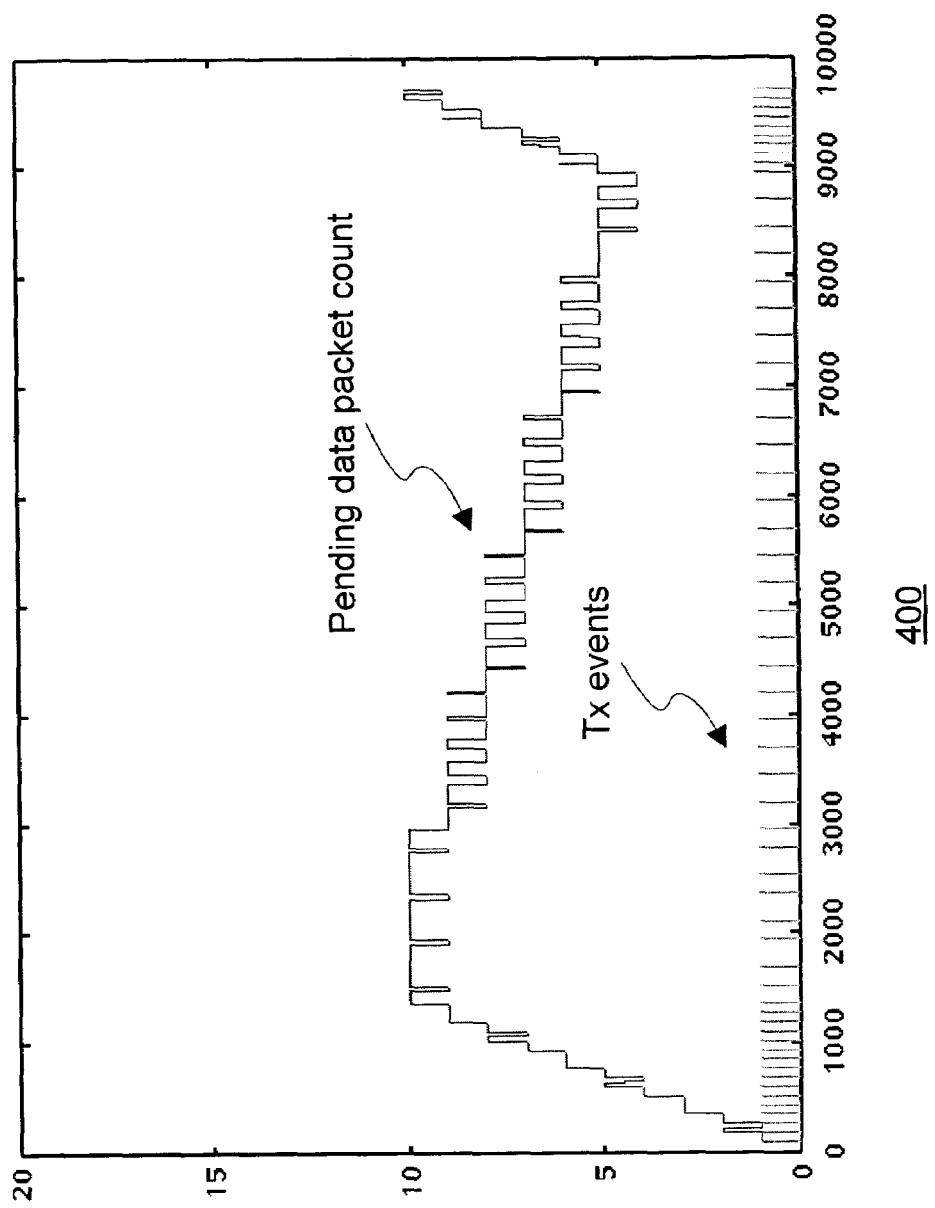
FIG. 4 is an example chart of pending data packet counts per unit of time along with transmit events for the node on the communication link.

FIG. 4 is an example chart 400 of pending data packet counts per units of time along with transmit events from node 110A to switch 120 on point-to-point communication link 101A. Chart 400 illustrates an example of the variation of the pending data packet count as determined, for example, by count feature 212. In this implementation, Rx buffer 122B in switch 120 may have a capacity equivalent to 10 units. Thus, the threshold pending data packet count value is 10 units.

The left side of chart 400 depicts an example where several data packets are forwarded from node 110A to switch 120 in a relatively short period of time. As the data packets are forwarded, the pending data packet count rises to 10 units in just over 1000 time units. Once at 10 units, an inserted PPG may result as subsequent data packets are delayed or throttled by node 110A to allow the pending data packet count to decrement below the threshold. The middle of the chart in FIG. 4 then shows an example of when the rate at which the data packets are forwarded slows to a rate that is less than the throughput capability associated with switch 120 and stored in byte rate 312B. Thus in the middle of the chart, the pending data packet count trends towards zero. The right side of the chart shows an example of a rise in the pending data packet count back to 10 units as the rate at which data packets are forwarded to switch 120 increases.

Figure 5:
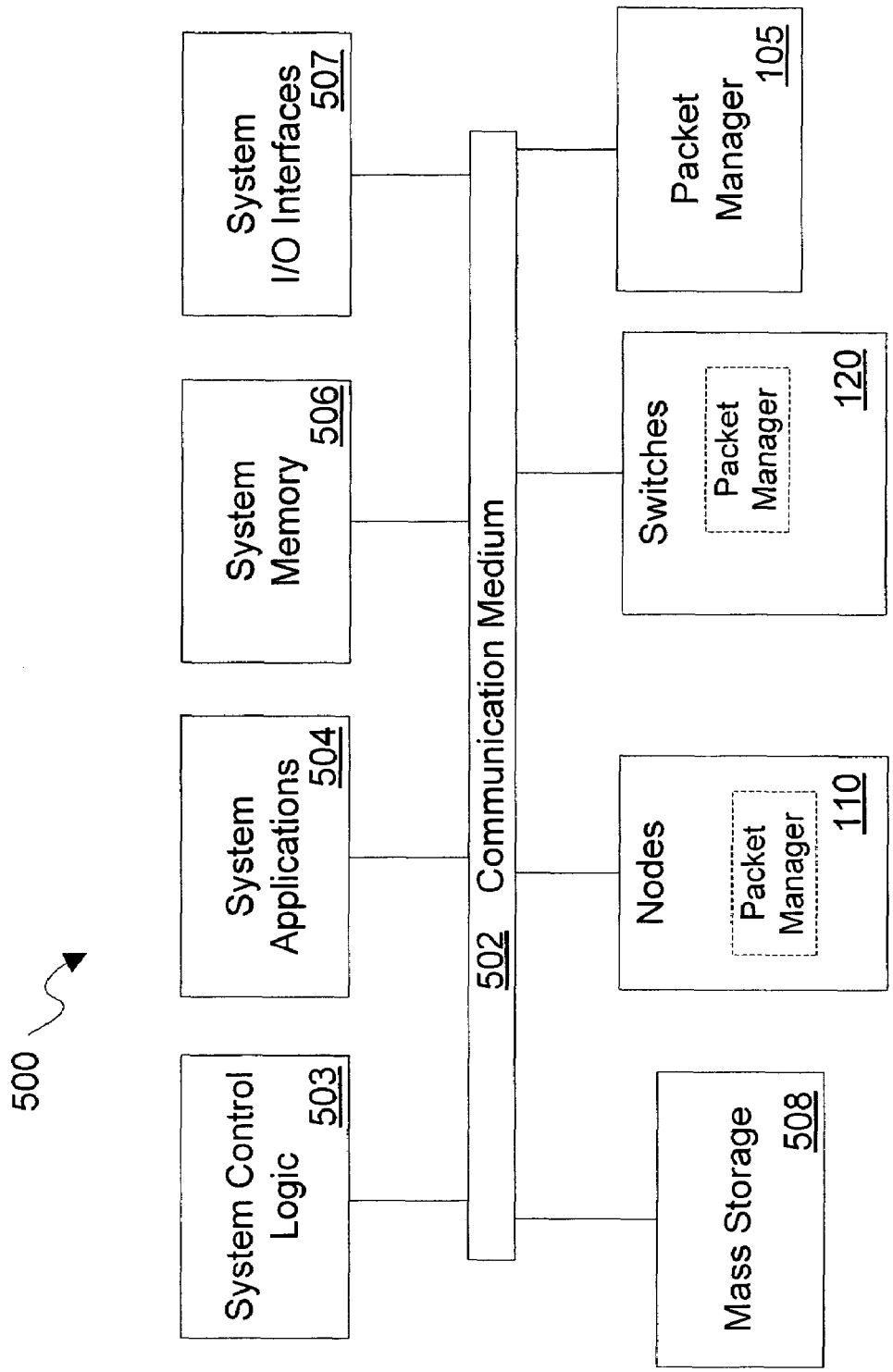
FIG. 5 is a block diagram of an example electronic system.

FIG. 5 is a block diagram of an example electronic system 500. Electronic system 500 includes communication medium 502, system control logic 503, system applications 504, system memory 506, I/O interfaces 507, mass storage 508, nodes 110, switches 120, and packet manager 105, each coupled as depicted.

In one example, data is forwarded through one or more communication links that may incorporate network 102 within electronic system 500. These communication links may be included within communication medium 502 and may consist of one or more point-to-point communication links such as point-to-point communication links 101A-C. The data may be forwarded from one node 110 to another node 110 through these point-to-point communication links. In one implementation, the data is also forwarded within electronic system 500 on a point-to-point communication link with an intermediary such as switch 120. The data may then be forwarded from the intermediary to another node 110 on another point-to-point communication link. In an alternative implementation, switch 120 may be the destination for data forward from a node 110 on a point-to-point communication link. Thus switch 120 does not act as an intermediate in this alternative implementation and may appear to the node 110 as just another node in electronic system 500.

Switch 120 may include one or more of a switch blade or a router for electronic system 500. Nodes 110 may represent elements of electronic system 500 which act as either an input (ingress) or output (egress) node or endpoint situated on communication medium 502. Nodes 110 may include any of a number of hardware and/or software element(s) to receive and transmit data within electronic system 500. Thus, nodes 110 may include one or more of a bridge, a microprocessor, network processor, software application, embedded logic, or the like. Nodes 110 and/or switch 120 may also be one or more of boards and/or blades coupled and/or to couple to electronic system 500.

In one example, system control logic 503 controls the overall operation of electronic system 500 and system applications 504 may provide internal instructions to system control logic 503. This may include instructions to facilitate system control logic 503's management and/or control of elements of electronic system 500.

System memory 506 may store information such as temporary variables or intermediate information. This information may be stored during execution of instructions by system control logic 503. System memory 506 may also temporarily store at least portions of data selected for forwarding by electronic system 500 to either elements within electronic system 500 (e.g., switch 120 and/or nodes 110) via communication medium 502 or elements remote to electronic system 500 via system I/O interfaces 507. The data may either originate from electronic system 500 (e.g., system control logic 503 or system applications 504) or may be received by electronic system 500 via system I/O interfaces 507.

In one example, nodes 110 act as the I/O endpoint for electronic system 500 which is linked (e.g., through a wired or wireless communication link) to another I/O processing endpoint in another electronic system through system I/O interfaces 507. These communication links may operate using communication standards such as IEEE 802.3, SONET, ATM, IEEE 802.11, IEEE 802.16 or the like.

As depicted in FIG. 5, electronic system 500 also includes a packet manager 105. In one example, packet manager may operate as a element within and/or responsive to electronic system 500. In another example, as depicted by the dashed boxes in nodes 110 and switch 120 in FIG. 5, packet manager 105 is resident within nodes 110 and switch 120.

In one implementation, packet manager 105 may facilitate the forwarding of data on communication links between elements within electronic system 500 and elements located remotely to electronic system 500. For example, nodes 110 utilizing I/O interfaces 507, may couple to remote nodes via one or more wired and/or wireless communication links. Packet manager 105 may facilitate the forwarding of data by reducing and/or minimizing the effects of possible congestion on these communication links.

In one example electronic system 500 may be a modular platform system that operates in compliance with an industry standard known as the PCI Industrial Computer Manufacturers Group (PICMG), Advanced Telecommunications Computing Architecture (ATCA) Base Specification, PICMG 3.0 Rev. 1.0, published Dec. 30, 2002, and/or later versions of the specification ("the ATCA specification"). In this example both switch 120 and nodes 110A-C may be boards and/or blades that operate in compliance with the ATCA specification and may forward at least portions of data to other elements of electronic system 500 using both in-band e.g., a switch fabric) and out-of-band (e.g., a base fabric) communication channels. At least a portion of these channels may be routed through a backplane for the modular platform system.

In one example, nodes 110 and switch 120 may forward data over a base fabric in the backplane using Ethernet communication protocols. In another example, nodes 110 and switch 120 may forward data over a switch fabric operating in compliance with one or more communication protocols. These protocols may be associated with and/or described by sub-set specifications to the ATCA specification and are typically referred to as the "PICMG 3.x specifications." The PICMG 3.x specifications include, but are not limited to, Ethernet/Fibre Channel (PICMG 3.1), Infiniband (PICMG 3.2), StarFabric (PICMG 3.3), PCI-Express/Advanced Switching (PICMG 3.4) and Advanced Fabric Interconnect/S-RapidIO (PICMG 3.5).

Referring again to memory 230 in FIG. 2 and memory 506 in FIG. 5. System memory 506 and/or memory 230 may include a wide variety of memory media including but not limited to volatile memory, non-volatile memory, flash, programmable variables or states, random access memory (RAM), read-only memory (ROM), flash, or other static or dynamic storage media.

In one example, machine-readable instructions can be provided to system memory 506 and/or memory 230 from a form of machine-accessible medium. A machine-accessible medium may represent any mechanism that provides (i.e., stores and/or transmits) information in a form readable by a machine (e.g., switch 120, nodes 110, packet manager 105). For example, a machine-accessible medium may include: ROM; RAM; magnetic disk storage media; optical storage media; flash memory devices; electrical, optical, acoustical or other form of propagated signals (e.g., carrier waves, infrared signals, digital signals); and the like.

Referring again to FIG. 1B, memory 112, 114, 116 and 122 may include RAM. RAM may include, but is not limited to, ferroelectric RAM (FRAM), dynamic RAM (DRAM), static RAM (SRAM), extended data output RAM (EDO RAM), synchronous DRAM (SDRAM).

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

References made in the specification to the term "responsive to" are not limited to responsiveness to only a particular feature and/or structure. A feature may also be "responsive to" another feature and/or structure and also be located within that feature and/or structure. Additionally, the term "responsive to" may also be synonymous with other terms such as "communicatively coupled to" or "operatively coupled to," although the term is not limited in his regard.

What is claimed is:

1. A method comprising:
 determining at a first node a pending data packet count for
  one or more data packets to be forwarded from the first node to a second node on a communication link between the first node and the second node, where data packets forwarded to the second node on the communication link are stored in a receive buffer of the second node;

receiving at the first node an indication from the second node of the second node's throughput capability, wherein determining the pending data packet count includes decrementing the pending data packet count at a given rate based on the received indication of the second node's throughput capability;

receiving at the first node a threshold data packet count value from the second node indicating a capacity of the receive buffer of the second node;

comparing at the first node the pending data packet count to the threshold data packet count value;

based upon the comparison of the pending data packet count to the threshold data packet count value, generating at the first node a signal to indicate that a transmit delay is not required between transmitting data packets; and forwarding the one or more data packets from the first node to the second node at a rate based on the generated signal.

2. A method according to claim 1, wherein determining the pending data packet count further includes:
incrementing the pending data packet count after a data packet is forwarded from the first node to the second node.

3. A method according to claim 2, wherein incrementing and decrementing the pending data packet count comprises incrementing and decrementing the pending data packet count by a unit based, at least in part, on an average data packet size in bytes.

4. A method according to claim 2, wherein the second node's throughput capability is based, at least in part, on resources available to the second node to process and forward data received via the communication link.

5. A method according to claim 1, wherein the first node forwards the one or more data packets to the second node at a rate based on the generated signal further comprises:
delaying the forwarding of each of the one or more data packets if the pending data packet count equals or exceeds the threshold pending data packet value, the delay to create a given packet to packet gap while the pending data packet count equals or exceeds the threshold pending data packet value.

6. A method according to claim 5, wherein the given packet to packet gap comprises a packet to packet gap based on a guaranteed minimum throughput for the communication link.

7. A method according to claim 6, wherein the guaranteed minimum throughput is based on a quality of service commitment for data associated with a given traffic class.

8. A method according to claim 1, wherein the communication link operates in compliance with the Ethernet standard.

9. An apparatus comprising:
a packet manager to determine a pending data packet count for one or more data packets to be forwarded from a first node to a second node on a communication link between the first node and the second node, where data packets forwarded to the second node on the communication link are stored in a receive buffer of the second node, the packet manager further to receive from the second node an indication of the second node's throughput capability, wherein determining the pending data packet count includes decrementing the pending data packet count at a given rate based on the received indication of the second node's throughput capability, the packet manager further to receive from the second node a threshold data packet count value indicating a capacity of the receive buffer of the second node, the packet manager further to compare the pending data packet count to the threshold data packet count value and communicate to the first node a signal based upon the comparison indicating that a transmit delay is not required between transmitting data packets, wherein the first node forwards the one or more data packets at a rate based on the generated signal.

10. An apparatus according to claim 9, wherein to determine the pending data packet count further includes the packet manager to:
increment the pending data packet count after a data packet is forwarded from the first node to the second node.

11. An apparatus according to claim 10, wherein the packet manager to increment and decrement the pending data packet count comprises the packet manager to increment and decrement the pending data packet count by a unit based, at least in part, on an average data packet size in bytes.

12. An apparatus according to claim 10, wherein the second node's throughput capability is based, at least in part, on resources available to the second node to process and forward data received via the communication link.

13. An apparatus according to claim 9, wherein the first node forwards the one or more data packets to the second node at a rate based on the generated signal further comprises the first node to:
delay the forwarding of each of the one or more data packets if the pending data packet count equals or exceeds the threshold pending data packet value, the delay to create a given packet to packet gap while the pending data packet count equals or exceeds the threshold pending data packet value.

14. An apparatus according to claim 9, further comprising:
a memory to store executable content; and
a control logic, communicatively coupled with the memory, to execute the executable content, to implement the packet manager.

15. A system comprising:
a first node on a communication link to forward data to a second node on the communication link, where data packets forwarded to the second node on the communication link are stored in a receive buffer of the second node;
random access memory (RAM) responsive to the first node, the RAM including a transmit buffer to store the data to be forwarded to the second node; and
a packet manager to determine a pending data packet count for one or more data packets to be forwarded from the transmit buffer to the second node, the packet manager further to receive from the second node an indication of the second node's throughput capability, wherein determining the pending data packet count includes decrementing the pending data packet count at a given rate based on the received indication of the second node's throughput capability, the packet manager further to receive from the second node a threshold data packet count value indicating a capacity of the receive buffer of the second node, the packet manager further to compare the pending data packet count to the threshold data packet count value and communicate to the first node a signal based upon the comparison indicating that a transmit delay is not required between transmitting data packets, wherein the first node forwards the one or more data packets from the transmit buffer at a rate based on the generated signal.

16. A system according to claim 15, wherein to determine the pending data packet count includes the packet manager to:
   increment the pending data packet count after a data packet is forwarded from the first node to the second node.

17. A system according to claim 16, wherein the packet manager to increment and decrement the pending data packet count comprises the packet manager to increment and decrement the pending data packet count by a unit based, at least in part, on an average data packet size in bytes.

18. A system according to claim 16, wherein the second node's throughput capability is based, at least in part, on resources available to the second node to process and forward data received via the communication link.

19. A system according to claim 15, wherein the first node forwards the one or more data packets to the second node at a rate based on the generated signal further comprises the first node to:
   delay the forwarding of each of the one or more data packets if the pending data packet count equals or exceeds the threshold pending data packet value, the delay to create a given packet to packet gap while the pending data packet count equals or exceeds the threshold pending data packet value.

20. A system according to claim 15, wherein the first node and the second node are to operate within a modular platform system, the modular platform system to operate in compliance with the Advanced Telecommunication Computing Architecture standard.

21. A system according to claim 20, wherein the communication link is to operate in compliance with the Ethernet standard.

22. A machine-accessible medium comprising content, which, when executed by a machine causes the machine to:
   determine at a first node a pending data packet count for one or more data packets to be forwarded from the first node to a second node on a communication link between the first node and the second node, where data packets forwarded to the second node on the communication link are stored in a receive buffer of the second node;
   receive at the first node an indication from the second node of the second node's throughput capability, wherein determining the pending data packet count includes decrementing the pending data packet count at a given rate based on the received indication of the second node's throughput capability;
   receive at the first node a threshold data packet count value from the second node indicating a capacity of the receive buffer of the second node;
   compare at the first node the pending data packet count to the threshold data packet count value;
   based upon the comparison of the pending data packet count to the threshold data packet count value, generate at the first node a signal to indicate that a transmit delay is not required between transmitting data packets; and
   forward the one or more data packets from the first node to the second node at a rate based on the generated signal.

23. A machine-accessible medium according to claim 22, wherein determining the pending data packet count includes the machine to:
   increment the pending data packet count after a data packet is forwarded from the first node to the second node.

* * * * *